Aug. 22, 1939    P. JESCHOR    2,170,054
APPARATUS FOR BORING CRANKCASE BEARINGS
Filed Feb. 24, 1937    6 Sheets-Sheet 1
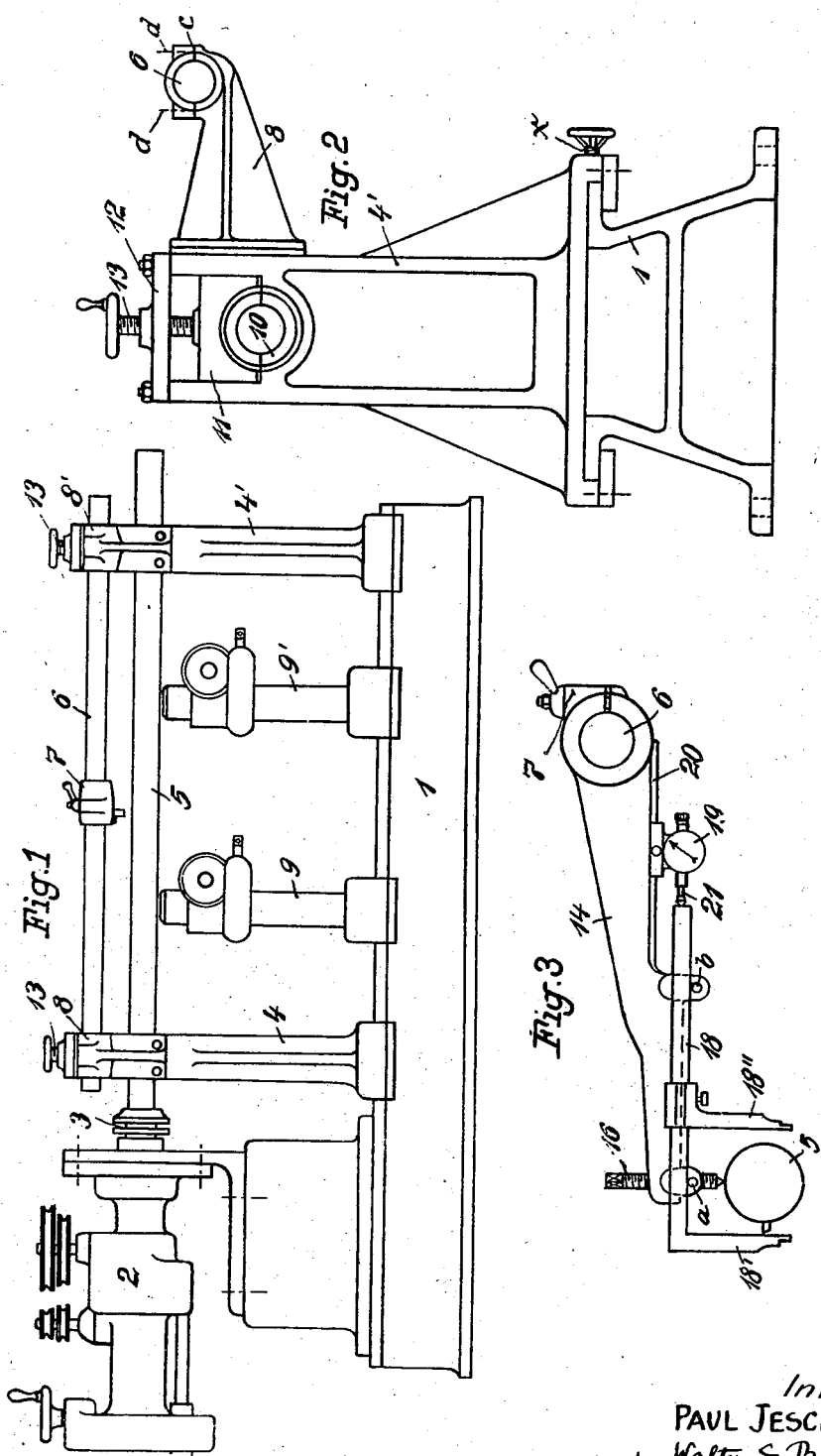
Inventor
PAUL JESCHOR
by Walter S. Bleistein
ATTORNEY Aug. 22, 1939   P. JESCHOR   2,170,054
APPARATUS FOR BORING CRANKCASE BEARINGS
Filed Feb. 24, 1937   6 Sheets-Sheet 2
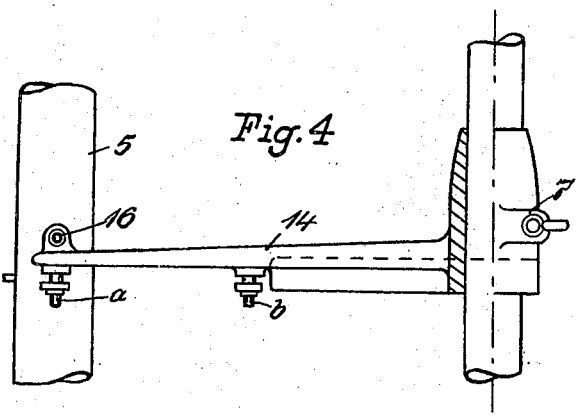
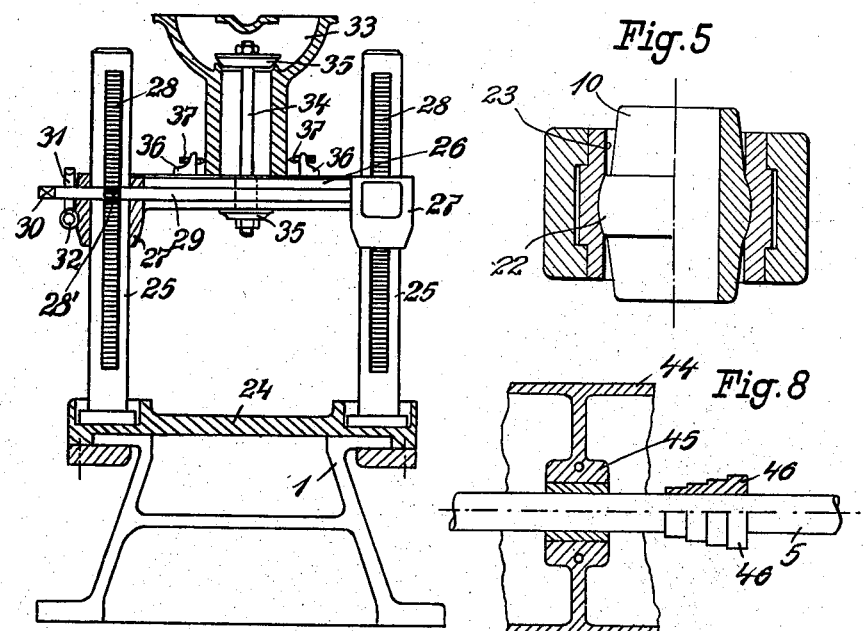
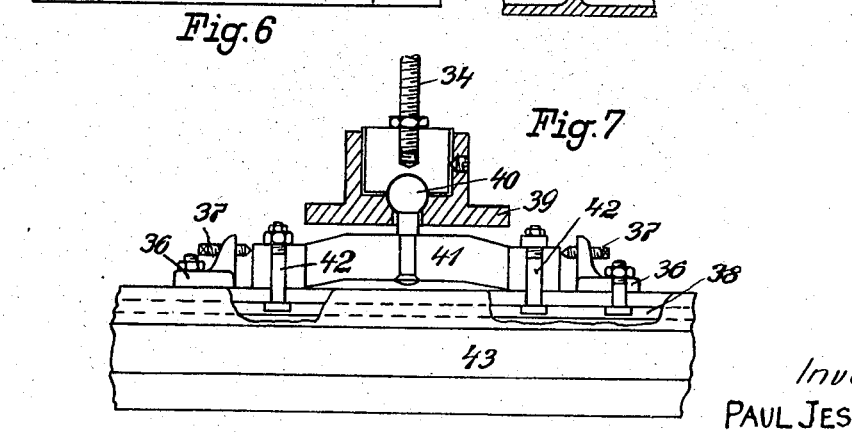
Inventor:
PAUL JESHOR
by Walter S. Bleistein
ATTORNEY Aug. 22, 1939. P. JESCHOR 2,170,054
APPARATUS FOR BORING CRANKCASE BEARINGS
Filed Feb. 24, 1937 6 Sheets-Sheet 3
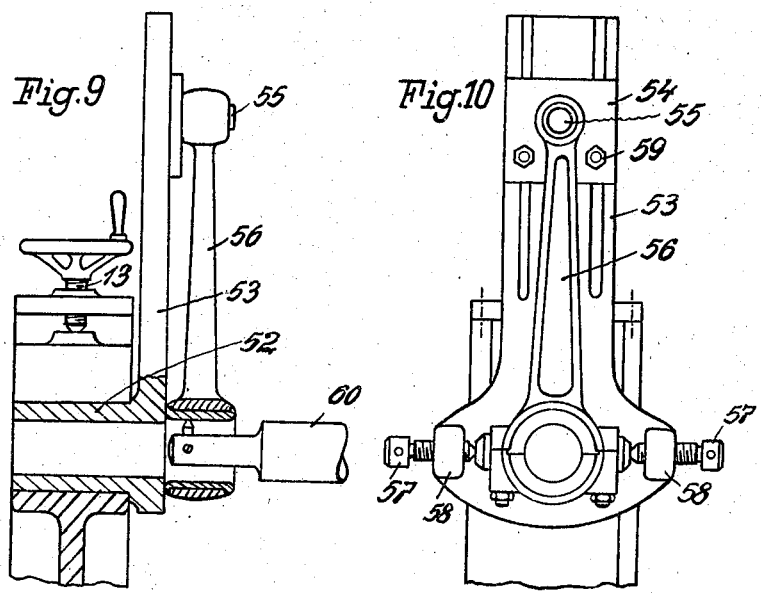
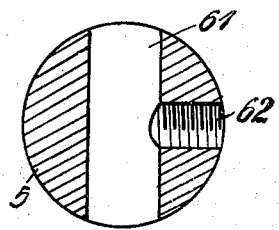
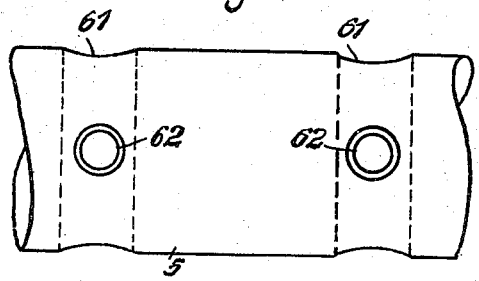
Inventor
PAUL JESCHOR
by Walter S. Bleistein
ATTORNEY

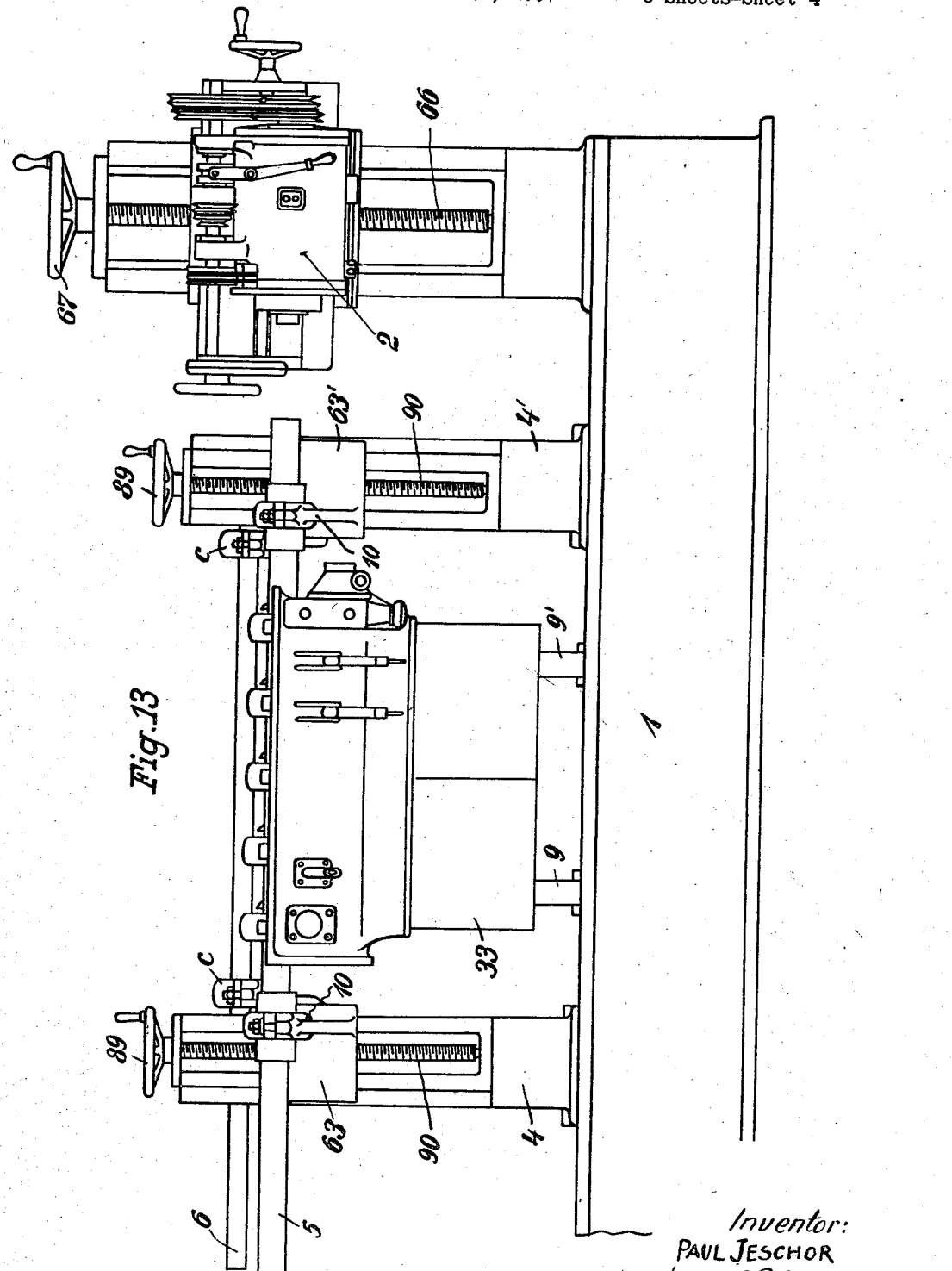

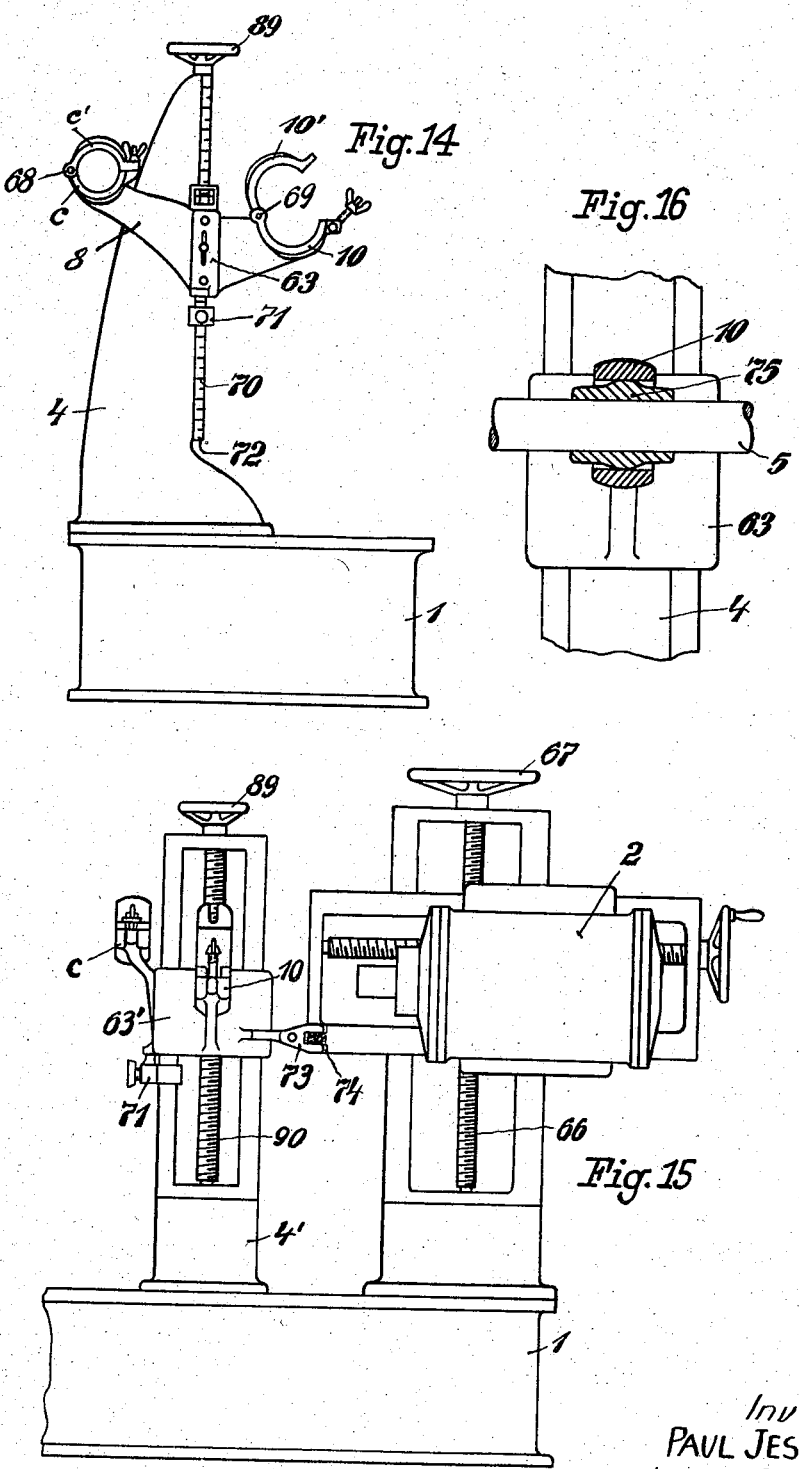

Aug. 22, 1939   P. JESCHOR   2,170,054
APPARATUS FOR BORING CRANKCASE BEARINGS
Filed Feb. 24, 1937   6 Sheets-Sheet 6
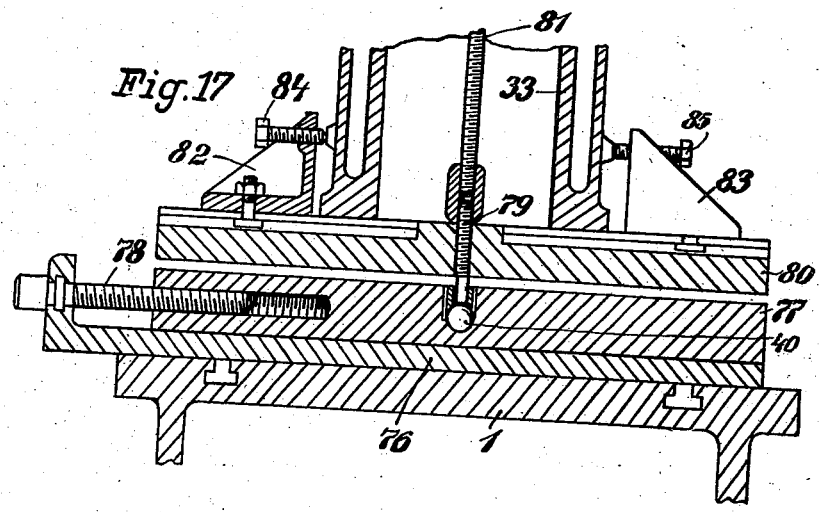
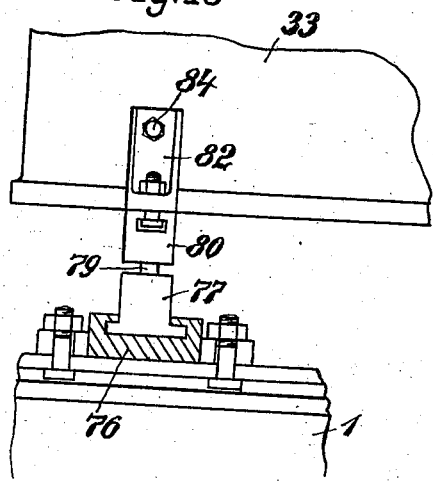
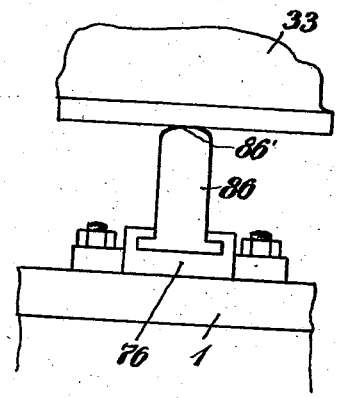
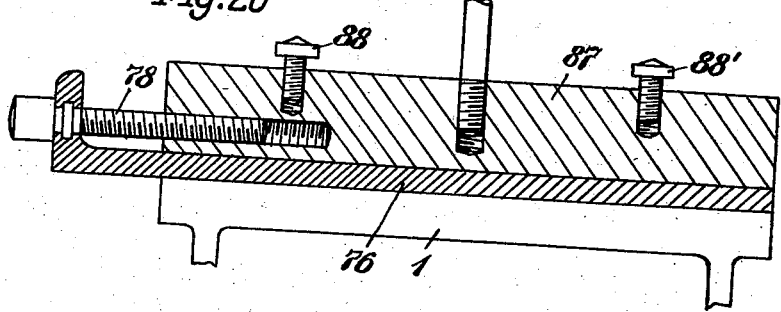
Inventor:
PAUL JESHOR
by Walter S. Bleistein
ATTORNEY Patented Aug. 22, 1939

2,170,054

UNITED STATES PATENT OFFICE 2,170,054

APPARATUS FOR BORING CRANKCASE BEARINGS

Paul Jeschor, Breslau, Germany

Application February 24, 1937, Serial No. 127,385
In Germany February 19, 1936

8 Claims. (Cl. 77—3)

The invention relates to an apparatus for boring crank case bearings, more particularly of automobile engines and aeroplane motors, both in production and in repairing work.

The main object of my invention is to provide means by which the engine or motor crank case can be secured in its position absolutely free from strains and stresses and by which the center axis of the crank case is brought into perfect alignment with the center axis of the cutter or boring shaft by a simple adjustment so as to obtain perfect alignment and true dimensions of the borings in the bearings.

The principal feature of the novel apparatus for performing this function consists in that on a bed plate provided with drill pillars two adjustable bearing supports are provided for the boring or aligning shaft and further bearings at the bearing supports for supporting a shaft of a device for adjusting the boring tools, and that on the bed plate two supports are provided for the crank case to be bored.

According to the invention, these supports or stools for the crank cases to be treated may be adjustable independently both in the horizontal plane axially and at right angles thereto, and in the vertical plane, and in this case the bearing supports for the boring or aligning shaft with the further bearings for the shaft of the adjusting or setting device for the boring tool may be adjustable horizontally only.

The apparatus according to the invention may also be constructed so that the supports for the crank cases are adjustable in the axial and transverse direction of the horizontal plane only. In this case the bearings receiving the boring or aligning spindle and the bearings further provided at the same bearing supports for receiving the shaft for the tool setting or adjusting device are commonly adjustable on the bearing supports in a vertical direction. The common adjustment is made possible by arranging the two bearings on a common slide adjustable at the respective bearing support.

The invention will be better understood by reference to the following detailed description in connection with the accompanying drawings showing by way of example some embodiments of the invention and in which:

Fig. 1 is a diagrammatical side elevation of one form of the apparatus;

Fig. 2 is a front view of one of the two bearing supports of Fig. 1, in an enlarged scale;

Fig. 3 is a side view of one modification of the tool setting device;

Fig. 4 is a plan view of the top of Fig. 3;

Fig. 5 is an axial section through one bearing of a bearing support;

Fig. 6 shows one of the supports for the crank case partly in a sectional, partly in a front view;

Fig. 7 is a front view of one modification of the other support for the motor crank casing;

Fig. 8 is a sectional view of a motor case bearing with the boring shaft and step centering ring;

Fig. 9 is a side view of a device for using the boring machine for treating connecting rod bearings;

Fig. 10 is a front view of Fig. 9;

Fig. 11 is a cross section through the boring shaft;

Fig. 12 is a fragmentary view of a boring shaft;

Figs. 13 to 20 illustrate another modification of the boring apparatus, viz:

Fig. 13 is a view of the entire boring machine;

Fig. 14 a side view of one of the supporting bearings;

Fig. 15 shows a portion of the bed plate with a bearing support and the pillar of the boring machine in a front view;

Fig. 16 is an elevation of a bearing with setting bearing bush, partly in axial section, partly in a front view;

Fig. 17 is an axial section through one of the supports for the motor crank case;

Figs. 18 and 19 show details of a support for the crank case;

Fig. 20 is a partial cross-section through a support arranged as a two-point support.

In the embodiments of the invention shown in Figs. 1 to 12, more particularly to Fig. 1, the arrangement on a bed plate 1 is shown of the boring machine proper 2 with elastic coupling 3 intermediate the boring machine 2 and boring spindle or cutter shaft 5, two bearing supports 4, 4' for the boring bar or spindle and two supports 9, 9' for the motor or engine crank case to be bored. Of the bearing supports 4, 4' one bearing support at least, for example the bearing support 4' is adjustable in the axial direction of the bedplate by means of a screw spindle x (Fig. 2). At the bearing supports 4, 4' brackets 8, 8' have been provided which support in bearings the shaft 6 for a tool setting device 7. Fig. 2 shows the special construction of the bearings arranged at the bearing supports for receiving the boring bar 5 and comprising adjustable bearing bushes 10 with a detachable cover 11 and cap plates 12 adjustable by means of spindle 13, said cap plates 12 serving to clamp the cover of the bearing for the boring bar; Fig. 2 also shows the construction of the brackets 8 supporting the shaft 6 of the tool setting device 7. Figs. 3 and 4 illustrate an embodiment of the tool setting device 7 possessing an arm 14 swinging around shaft 6 which may be secured to shaft 6 in any position by means of a clamping device 7. Shaft 6 is clamped to the brackets 8 fixed to the bearing supports 4, 4', in bearings c by means of diagrammatically indicated screws d which are unscrewed when shifting bearing supports 4, 4'. Arm 14 is provided with two projecting lugs a, b, pins or similar devices, upon which a caliper in the shape of a sliding gauge with a guide 18 for a shiftable cheek 18" can be placed in such a manner that the checks 18' and 18" adjusted to the diameter of the shafts or the like running in the motor case bearings, extend downwards at the sides of boring bar 5, and that the boring tool is brought into contact with both cheeks if the boring bar is revolved by 180°. From a measuring dial 19 may be read the distance, by which the sliding bar 18 of the sliding gauge has been shifted. The measuring dial 19 is secured shiftably at the arm 14 on a slide way 20 so that a calipering pin 21 of the measuring dial may be made to contact with the end of the sliding gauge bar 18. This measuring device makes it possible to adjust the knives or cutters of the boring bar 5 in the said boring bar installed in the machine, to the position in which the boring bar is to operate. A separate cutter will be provided in the boring bar for every bearing. Since the swing arm 14 has been arranged shiftable in an axial direction on shaft 6, it may be brought into position above every cutter to be set or adjusted.

In view of the great accuracy required from a precision bearing boring machine, every strain on the boring bar should be avoided and the alignment of the boring bar bearing centers must be kept absolutely perfect by obviating all deviations that may be caused by shifting one of the bearing supports 4, 4' on bed plate 1. In order to make up for such deviations of the boring bar axis, the bearing bushes 10 of the boring bar are adjustable. Moreover, every bearing bush 10 is provided with a spherical collar 22 (Fig. 5) fitted into a corresponding spherical recess in the boring of bearing 23. The bearing bushes 10 are therefore free to adjust themselves to any position of the boring bar so that any side strains on the boring bar caused by deflections in the alignment of the bearing support borings are rendered impossible.

The two supports 9, 9' for the motor crank case arranged on the bed plate 1, are shown separately in Figs. 6 and 7. In Fig. 6 the character 24 denotes a base plate of one of the two supports, said base plate being adjustable on bed plate 1. Secured in base plate 24 are round sliding bars 25, positioned on which is a bridge piece 26 with guides 27. 28 are racks meshing with pinions 28' arranged on a shaft 29, which is supported in bridge piece 26 or in the guides 27, respectively, and may be rotated directly by means of a crank placed on a square-shaped extension 30 of shaft 29, whereby the bridge piece 26 may be moved upwards and downwards on the guides 25. On shaft 29 a worm wheel 31 meshes with a worm 32, which is of the dropworm type. The shaft 29 may be actuated, therefore, by way of the extension 30 or by means of worm wheel 31 and worm 32. In the first case a coarse adjustment, in the second case a fine adjustment of the bridge piece is used. The coarse adjustment serves to set the bridge piece at the required height, the fine adjustment effects the accurate setting of the crank case or the bearings of the crank case in relation to the boring bar 5. The motor block 33 is fixed by means of tensioning screws 34 and tensioning plates 35 to the bridge piece 26, which is provided with a slightly bulging or convex surface. In the bridge piece 26 a T-groove 38 is provided, and brackets 36 may be clamped into this groove to the side of the clamped-down motor block. The brackets 36 are provided with adjusting screws 37, by means of which the motor block placed on the bridge piece can be shifted laterally and may be secured against lateral shifting.

In Fig. 7 the bridge piece of the second support 9 is shown provided with a reversible bearing of any suitable construction. In the construction shown a cup 39 has been provided, which will be inserted into a boring of the motor case to be treated and will be screwed tightly against the cylinder head surface by means of tensioning screws 34. In cup 39 a ball pivot 40 is arranged, the trunnion or pin of which is riveted to an auxiliary bridge piece 41 which is secured to the crank case prior to the introduction of the latter.

The arrangement of the motor crank case on the supports is effected in this way that prior to the introduction of the motor crank case into the machine the supports 9, 9' are displaced on bed plate 1 so that the motor crank case, when placed into position, is supported by one boring each on one of the two bridge pieces. The bridge pieces may be positioned so that the weight of the motor block is distributed as evenly as possible on the two bearing supports. The motor block contacts on the one side of the bridge piece 26 with its bulging surface, at the other side with the tilting bearing or auxiliary bridge piece 41, respectively, which is tightened on the bridge piece 43 by means of the screws 42. Since the upper surface of the bridge piece 26, contrary to the reversible bearing bridge piece 43, is slightly bulging, any side strain on the motor crank case is made impossible and the accurate alignment of the case bearing centers is assured. Owing to the even distribution of the weight of the motor case on the two bearing supports side strains of the motor case due to the weight of the motor case proper are also obviated to a great extent.

In Fig. 8 a section of a motor case 44 with a bearing 45 is shown and a stepped centering ring 46 shiftable on boring bar 5. In order to center boring bars for boring bearings centering cones are usually used which do not, however, ensure perfect centering, since in many cases the flanks of the crank cases are not machined, and the cover plates of the crank case bearings are not kept by the bearing bolts in their axial alignment to such perfection that the edge of the bearing cover is in the same plane or level with the edge of the bearing portion positioned in the motor crank case. In such cases a cone is pressed out of its centrical position and a bad alignment of the bearing borings with the boring bar will result. These drawbacks are removed by using centering rings 46, which have been stepped so that they can be used for different bores. A measuring spindle with a calipering pin, which is operated by a measuring clock or dial, may also be used.

The bearing fine boring machine may be used also for other purposes besides for motor case bearings, for example for working connecting rod bearings, for which purpose an auxiliary device is provided as shown in Figs. 9 and 10. This device consists of a bush 52 with guide 53. The bush 52 is inserted into the boring of the boring bar bearing of the bearing support 4 adjacent to the boring machine and is clamped firmly so that the guide 53 is directed towards the boring machine. On guide 53 glides a slide 54 in which are provided replaceable trunnions 55, serving to support the connecting rod 56. By means of adjusting screws 57 positioned in lugs 58 of the guide 53, the head of the connecting rod is secured and aligned horizontally with the boring bar. The vertical adjustment is effected by means of a slide 54 which may be clamped to a guide 53 by means of screw bolts 59. A boring bar 60 is provided at the boring machine.

For working crank case bearings at low cost it is necessary to provide one boring tool or steel cutter for every bearing. The distances between crank case bearings varying with the many different types of motors, a great number of boring bars would be necessary. In order to avoid this, boring bars are used having boring holes 61 at uniform distances, as shown in Figs. 11 and 12, for inserting the cutters, and with threaded apertures 62 at right angles to the boring holes 61, in order to secure the cutters which are adjusted in the boring holes 61 for example by means of adjusting screws acting on the ends of the cutters. The cutter holes are so spaced from one another that for the most different crank case bearing spaces a suitable cutter hole is available. A further advantage of this arrangement is the fact that not all cutters will operate at the same time so that the strain exerted on the boring bar is lower.

The bearing fine boring machine as per Figs. 1 to 12 is operated or manipulated in the following manner:

The bearing support 4' is displaced on bed plate 1 towards the bearing support 4 corresponding to the length of the motor crank case to be machined. The support stools 9, 9' are shifted on bed plate 1 to the proper position and the motor block is placed upon the bridge pieces 26 and 43, respectively, after the reversible bearing or the cup 39 of the reversible bearing, respectively, has been secured to the motor block. The motor block is now clamped to the bidge pieces at slight pressure. Before the motor block is raised in the guides of the bearing supports, the boring bar 5 required for the motor bearing of the respective diameter is placed into the bearing supports 4 and 4' together with the suitable setting bearing bushes 10, after the corresponding stepped centering rings 46 have been pushed on the boring bar so, that they rest at the inner sides of the bearing supports. The respective trunnion or journal of the crank shaft is measured by means of the sliding gauge 18, the gauge is placed on the lugs a, b and the cutter is adjusted correspondingly. The same is done with the other cutters by displacing the swing arm 14 on the shaft 6 correspondingly.

After the boring bar has thus been made ready for work, the bridge pieces 26 and 43 with the motor crank case are raised by means of the coarse adjustment and are now centered by means of the fine adjustment vertically and by means of the adjusting screws 37 horizontally with the boring bar 5. Now the covers are screwed on to the two end bearings of the motor crank case. The center alignment is correct if the respective step of the stepped centering ring 46 may be introduced into the case bearing at a fair sliding fit. With the motor case in this position, the distance of centres of the case bearing borings and the cam shaft boring, and if necessary also of further borings parallel to the crank shaft may be controlled. Differences that may be showing can be removed by horizontal displacement of the cylinder block on the bridge piece by means of the adjusting screws 37. Now the motor case is definitely fixed by means of the tension screws 34 or the bolts of the auxiliary bridge piece 41. After installing the motor bearings in the case bearing borings and after the covers of the case bearings have been tightened, the actual boring operation may be commenced, provided the boring bar has been elastically coupled to the boring machine. After the boring operation forming the bearing borings is finished, the cutters are removed and other suitably formed cutters are inserted for operating on the bearing flanks and grooves.

Instead of the step centring device 46 a centering device provided with a measuring spindle and a measuring dial may be used. It is of advantage to provide two of such devices, i. e., one for each bearing support.

In case the bearing covers of the motor case to be treated have had their contacting surface filed, as may often happen at a former occasion for the purpose of refitting the motor bearings, so that their boring does not any more represent a correct semi-circle, it is impossible in centering the motor case to screw on the covers of the end bearings. Aligning and centring can in this case be done only according to the half bearing boring in the motor crank case; for this purpose the centring rings provided are especially suited, whereas the use of cones is impossible with refiled bearings and results in wrong center alignments.

The apparatus illustrated in Figs. 13 to 20 differs from the apparatus shown in Figs. 1 to 12 in particular by the feature that the supports 9, 9' for the motor cases to be treated can be adjusted horizontally only, and that the bearings 10 serving to support the boring and aligning bar, and the bearings c for receiving the shaft for the cutter setting device at the horizontally adjustable supports 4, 4' are commonly adjustable in a vertical direction. Also the actual boring machine is correspondingly adjustable in a vertical direction. In the diagrammatical illustration of the entire boring machine in Fig. 13 are arranged on bed plate 1 similar to Fig. 1, the two bearing supports 4, 4', the boring machine pillar with the boring machine 2 and between the bearing supports 4, 4' the supports or stools 9, 9' for the motor crank cases 33 to be bored. At the bearing supports 4, 4' the slides 63 and 63' are adjustable vertically by means of hand wheels 89 and spindles 90. The slides are provided at brackets 8 with bearings 10 for supporting a boring or aligning bar 5. In addition bearings c are provided at the slides for receiving a shaft 6 for a tool setting device constructed for example as shown in Fig. 3. The supports 9, 9' for the motor crank cases 33 can be shifted on bed plate 1 axially and transversely thereto (not shown). The boring machine 2 is adjustable vertically at the boring machine pillar by means of a spindle 66 with a hand wheel 67.

As is shown in Fig. 14 in detail the bearings 10 for the boring and aligning bar 5, and the bearings c for the shaft 6 of the tool setting device are provided with covers 10' and c', respectively, swinging in hinges 68 or 69, respectively. The bearing cover of the bearing c is shown put up. At the bearing supports a measuring scale 70 and a stop or lug 71 are provided, which may be shifted and fixed by clamping at a sliding way 72 of the bearing support and which serve to place the slide 63, after it has been displaced, back again into exactly the same position, without being compelled to read the former adjustment or setting at the measuring scale and to move the slide back again into its former position.

Fig. 15 illustrates in particular a device for setting the boring machine 2 exactly in line with the bearing support 4'. This arrangement consists of a lever 73 hinged to the slide 63' of the bearing support 4' and catching into a notch 74 or similar arrangement provided at the boring machine 2 as soon as the latter is in its proper position.

Fig. 16 shows how the boring bar 5 is supported in a boring bar bearing 10 similar to that in Fig. 5, by employing a setting bearing bush 75 constructed so that the boring bar may take up a position inclined to the surface of the bed plate 1.

In the support for the motor case 33 shown in Figs. 17 and 18 and similar to Fig. 7 a point-shaped supporting surface has been provided. The support possesses a base plate 76, a slide 77 adjustable crosswise to the bed plate 1 by means of a spindle 78. On a pivot 79 of a ball joint 40 a plate has been arranged movable to all directions by means of the ball joint 40. The motor block 33 is fixed to the plate 80 by means of a tension bolt 81. Tension brackets 82 and 83 sliding in T-grooves of the plate 80 and fixable on plate 80 by means of the said T-grooves, are provided with tension bolts 84 and 85, which are screwed against the motor block and secure it against lateral displacement.

The second support for the motor cases to be worked may, according to Fig. 19 be provided with a supporting surface in the shape of a line or edge which is formed by a curved end surface 86' in the base plate 76. The second support may further be provided, as shown in Fig. 20, with a two point support, the supporting slide 87 having supporting points 88 and 88'. For displacing the slide 87 on base plate 76 a spindle 78 is used as shown in Fig. 17.

The device illustrated in Figs. 13 to 20 is used for boring motor case bearings in the following manner:

The bearing support 4 more distant from the boring machine is shifted towards the bearing support 4' adjacent to the boring machine pillar until the motor crank case to be bored just fits between both bearing supports and in this manner the shortest self-supporting length of the boring bar is obtained.

The supports 9 and 9', Fig. 1, are shifted to correct distance on the bed plate 1 and the motor block 33 is placed on the support with the head surface of the cylinder. The covers of the borings of the motor case bearings are removed, the covers 10' of the boring bar bearing 10 are swung up and the boring bar 5 is put in place, after the suitable centring rings (for instance as per Fig. 8) and the setting bearing bushes 75 (Fig. 16) have been slid on. The cover 10' of bearings 10 are now closed and the slides 63, 63' are moved downwards by means of spindles 90 fitted with hand wheel 89 until the centring rings properly contact in the end bearings of the motor case. At the same time and almost automatically the motor case bearing is placed into exact alignment with the boring bar 5. For the control and fine adjustment of the boring bar the covers may be screwed onto the two case end bearings, and by rotating the centring rings their perfect fit in the closed case end bearings may be controlled and, if necessary, corrected by moving up and down the slides 63, 63'.

Now the block 33 may be secured on the supports 9 and 9' by means of the tension bolts 81 (Fig. 17) and secured against lateral displacement by means of the tension screws 84, 85 of the tensioning brackets 82 and 83. Only in exceptional cases, for example with very heavy crank cases, is it necessary to displace the supports crosswise. All crank cases of moderate weight adjust themselves automatically in alignment with the boring bar as soon as the boring bar 5 with the centring rings are lowered into the crank case bearings.

In most cases the boring tools of the boring bar may be adjusted and set in the last described position of the boring bar. If the shape of the motor case does not allow this, the cutters are inserted before the motor case is placed into the machine. For this purpose it is only necessary to adjust the slides 63, 63' to a uniform level by means of the measuring scales 70 and stops 71.

After fixing absolutely the case in its proper position, the boring bar 5 is removed again from its bearing 10 and now the actual motor bearing bushes are placed into the crank case, that is one of the two halves of the bearing bush only. Now the boring bar is inserted definitely into the bearings 10, and the bearing covers of the motor case are fitted with the second half of the bearing bushes and are screwed tight. The boring machine 2 is shifted at the pillar of the boring machine by means of hand wheel 67 and spindle 66 so that the alignment of the spindle of the boring machine coincides entirely with that of the boring bar, which is done by means of the device 73, 74. After coupling the boring machine shaft to the boring bar by means of a double universal ball coupling or ball joint, the boring operation may be commenced.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

Having thus described my invention, what I claim is:

1. In a boring machine, the combination of a cutting shaft, driving means for said shaft, a first pair of supporting members constituting bearings for said shaft, a second pair of supporting members for the work to be machined, said second pair being arranged intermediate of the members of said first pair, one of the members of said second pair being so arranged and constructed as to offer a substantially one-point supporting face to said work, and the other one having substantially two points of support, and means for individually adjusting the members of one of said pairs in a vertical direction.

2. A device as claimed in claim 1, further comprising means for adjusting said work in a horizontal direction transversely of the axis of said shaft and for securing the work in the adjusted position.

3. A device as claimed in claim 1 in which the other member of said second pair embodies a substantially line-shaped supporting face for the work, said line being substantially transverse of the cutter shaft axis.

4. A device as claimed in claim 1 in which the other member of said second pair embodies a convex supporting face for the work, said face extending substantially transversely of the cutter shaft axis.

5. In a boring machine, the combination of a cutter shaft, a pair of first supporting members constituting bearings for said shaft, a pair of second supporting members for the work to be machined, said second pair being arranged intermediate of the members of said first pair, a tiltable support on the first member of said second pair, said tiltable support constituting a substantially one-point support, the other member of said second pair being so arranged and constructed as to offer a substantially line-shaped supporting face, said face being arranged substantially transversely of the cutter shaft axis, and means for individually adjusting the members of one of said pairs in a vertical direction.

6. A device as claimed in claim 5, in which said tiltable support comprises a substantially cup-shaped part adapted to be secured to the work, a transverse member adapted to be secured to the first member of said second pair, and a ball pivot for connecting said cup-shaped part to said transverse member.

7. In a boring machine, the combination of a cutting shaft, driving means for said cutting shaft, a first pair of supporting members, bearings on said supporting members for said cutter shaft, said bearings being universally movable so as to allow for a slight disalignment of the bearing axes, means for individually adjusting the bearings on said supporting members in a vertical direction, a second pair of supporting members for the work to be machined, the members of said second pair being arranged between the members of said first pair and individually adjustable in a direction substantially parallel to the cutter shaft axis, and one of the members of said second pair being so arranged and constructed as to offer substantially a one-point supporting face, and the other one having substantially two points of support.

8. A device as claimed in claim 7 further comprising means for adjusting said driving means in a vertical direction, a universal coupling for connecting said driving means to said cutter shaft, said coupling being adapted to allow for a slight disalignment of the axes of the cutter shaft and said driving means, and locking means at said driving means and that cutter shaft bearing which is adjacent to said driving means, said locking means being adapted to interlock when the axes of the last mentioned shaft bearing and of the driving means are in registry as to their height.

PAUL JESCHOR.